United States Patent [19]
Ando et al.

[11] Patent Number: 5,578,680
[45] Date of Patent: Nov. 26, 1996

[54] VIBRATION-ABSORBING ELASTOMERIC COMPOSITE, PROCESS FOR MAKING THE SAME, AND VIBRATION DAMPER COMPRISING THE SAME

[75] Inventors: Takao Ando, Kyoto; Katsura Gohda, Takatsuki; Eiji Ichihara; Hiroshi Itayama, both of Kyoto, all of Japan

[73] Assignee: Sanyo Chemical Industries, Ltd., Kyoto, Japan

[21] Appl. No.: 121,880

[22] Filed: Sep. 17, 1993

[30] Foreign Application Priority Data

Sep. 17, 1992 [JP] Japan .................................. 4-275295

[51] Int. Cl.$^6$ ................................................ C08L 75/04
[52] U.S. Cl. .......................... 525/131; 525/123; 525/125; 525/440; 525/455; 527/600
[58] Field of Search ........................... 525/131, 125, 525/123, 455, 440; 527/600

[56] References Cited

U.S. PATENT DOCUMENTS

| | | | |
|---|---|---|---|
| 3,536,638 | 10/1970 | Dosmann | 521/75 |
| 3,919,351 | 11/1975 | Chang et al. | 525/131 |
| 3,970,716 | 7/1976 | Evers et al. | 525/131 |
| 4,035,440 | 7/1977 | Khanna et al. | 525/131 |
| 4,076,679 | 2/1978 | Turner | 525/131 |
| 4,143,091 | 3/1979 | Chang et al. | 525/131 |
| 4,261,946 | 4/1981 | Goyert et al. | 525/131 |
| 4,555,546 | 11/1985 | Patel | 525/195 |
| 4,654,402 | 3/1987 | Patel | 525/194 |
| 4,758,629 | 7/1988 | Deyrup et al. | 525/194 |
| 4,766,174 | 8/1988 | Statz | 525/131 |
| 4,971,864 | 11/1990 | McCord | 428/516 |
| 4,990,557 | 2/1991 | Lee | 525/131 |
| 5,085,816 | 2/1992 | McCord | 264/171 |
| 5,143,755 | 9/1992 | Moore, III et al. | 525/123 |
| 5,187,228 | 2/1993 | Perron et al. | 525/66 |
| 5,194,505 | 3/1993 | Brugel | 525/131 |
| 5,221,785 | 6/1993 | Ando et al. | 525/131 |
| 5,244,971 | 9/1993 | Jean-Marc | 525/64 |
| 5,274,023 | 12/1993 | Takahashi et al. | 525/131 |
| 5,274,039 | 12/1993 | Sirinyan et al. | 525/131 |
| 5,278,231 | 1/1994 | Chundury | 525/66 |
| 5,278,257 | 1/1994 | Mülhaupt et al. | 525/131 |

FOREIGN PATENT DOCUMENTS

| | | |
|---|---|---|
| 0347794 | 12/1989 | European Pat. Off. . |
| 2229350 | 8/1976 | France . |
| 2036905 | 2/1972 | Germany . |
| 2051392 | 4/1972 | Germany . |
| 3830759 | 3/1990 | Germany . |

OTHER PUBLICATIONS

Sax et al.; *Hawley's Condensed Chemical Dictionary, Eleventh Edition*; Van Nostrand Reinhold; New York; 1987; p. 1017.

*Primary Examiner*—James J. Seidleck
*Assistant Examiner*—Rabon Sergent
*Attorney, Agent, or Firm*—Oblon, Spivak, McClelland, Maier & Neustadt, P.C.

[57] ABSTRACT

Vibration-absorbing elastomeric composites, having improved vibration-damping properties with improved moldability and resin properties suitable for molded products, are obtained by reacting, insitu in a melted thermoplastic resin such as olefin-diene copolymer, a polyisocyanate with a polyol to form a polyurethane having a nitrogen atom content of at least 3% and having a solubility parameter which is higher by at least 2.5 than that of said thermoplastic resin.

32 Claims, No Drawings

VIBRATION-ABSORBING ELASTOMERIC COMPOSITE, PROCESS FOR MAKING THE SAME, AND VIBRATION DAMPER COMPRISING THE SAME

BACKGROUND OF THE INVENTION

1. Field of the Invention

This invention relates to vibration-absorbing elastomeric composites, having improved vibration-damping properties, particularly, those used for the purpose of accelerating damping of vibration and decreasing amplitude in various apparatuses, equipments or devices, vehicles and so on.

2. Description of the Prior Art

Heretofore, as vibration dampers (or vibration insulators), there have been known those comprising polymers, such as natural rubber, butadiene rubber, isoprene rubber, butyl rubber, ethylene-vinyl acetate copolymer, epoxy resin, vinyl chloride resin, or blend of these (for instance JPN Patent Lay-open Nos. 227452/1990, 283738/1990 and 759/1991), and those comprising these polymers containing dispersed therein inorganic particles, such as graphite, calcium carbonate, iron oxides, carbon black, mica and the like (for example JPN Patent Lay-open No.227452/1990).

These vibration dampers, however, have drawbacks, such that vibration-damping properties are not satisfied because of insufficient damping capacity, effective temperature range remote from room temperature, or narrow effective temperature range; and that their uses are restricted because of poor moldability, or insufficient rigidity and poor shape retention, when they are molded into rubber components to be assembled to structures or machines.

SUMMARY OF THE INVENTION

It is an object of the present invention to provide a vibration-absorbing elastomeric composite having improved damping properties.

It is another object of this invention to provide a vibration-absorbing elastomeric composite effective over a wide temperature range including room temperature.

It is still another object of the invention to provide a vibration-absorbing elastomeric composite having improved moldability and enough rigidity to be formed into molded products.

It is yet another object of the invention to provide a vibration damper or vibration insulator and a vibration-deadened component or member, having improved damping properties.

Briefly, these and other objects of the present invention as hereinafter will become more readily apparent have been attained broadly by a vibration-absorbing elastomeric composite, which comprises (A) 10–60% by weight of at least one thermoplastic resin and (B) 90–40% by weight of a polyurethane resin, prepared by reacting a polyisocyanate with a polyol insitu in a melted thermoplastic resin (A);

wherein said polyurethane has a nitrogen atom content of at least 3% and has a solubility parameter which is higher by at least 2.5 than that of said thermoplastic resin.

DETAILED DESCRIPTION OF THE PREFERRED EMBODIMENTS (A) Thermoplastic resin

Suitable examples of the thermoplastic resin (A) include olefinic polymers, ethylene-unsaturated ester copolymers and natural rubbers.

Suitable olefinic polymers include (co)polymers (polymers and copolymers; similar expressions are used hereinafter) of monoethylenically unsaturated hydrocarbon and/or diene, for example, olefins containing 2 to 30 carbon atoms (such as ethylene, propylene, butene-1, isobutene, and C5–30 α-olefins written in U.S. Pat. No. 4,931,483), styrene and homoloques thereof (such as C1–18 alkyl-substituted styrenes), and dienes (such as butadiene and isoprene). Illustrative of olefinic polymers are (co)polymers of monoethylenically unsaturated hydrocarbon(s), for example, ethylene-α-olefin (C3–30) copolymers (such as ethylene-propylene copolymer and ethylene-butene-1 copolymer) and polyisobutylene, (co)polymers of diene(s), such as synthetics polyisoprene and polybutadiene, and (co)polymers of monoethylenically unsaturated hydrocarbon with diene, such as isobutylene-isoprene copolymer, EPDM (ethylene-propylene-diene terpolymers) and styrene-diene copolymers.

Suitable ethylene-unsaturated ester copolymers ethylene-unsaturated acid copolymers include, for example, copolymers of ethylene with vinyl esters (such as vinyl acetate, vinyl propionate and vinyl butyrate), unsaturated carboxylic acids [such as (meth)acrylic, ethacrylic, crotonic, sorbic, maleic, fumaric, itaconic and sinnamic acids], and/or esters (such as C1–18 alkyl esters) of these unsaturated acids [such as methyl, ethyl, n- and i- propyl and butyl, n-octyl, 2-ethylhexyl, lauryl and stearyl (meth)acrylates].

Suitable natural rubbers include those obtained from latex of *Hevea brasiliensis*.

Among these thermoplastic resins (A), preferred are isobutylene-isoprene copolymer and ethylene-propylene copolymer, particularly isobutylene-isoprene rubber and ethylene-propylene rubber (EP rubber).

Weight average molecular weight of these thermoplastic resins (A) is usually about 10,000 to about 3,000,000, preferably about 10,000 to about 1,000,000.

(B) Polyurethane Resin

Polyurethane resin (B) can be prepared by reacting a polyisocyanate (B1) with a high molecular weight polyol (B2) and a chain extender (B3) insitu in a melted thermoplastic resin (A) as mentioned above.

In producing said polyurethane resin (B), there may be used any of organic polyisocyanates, conventionally employed for production of polyurethanes. Suitable polyisocyanates (B1) include, for example, aromatic polyisocyanates containing 6–20 carbon atoms [except carbon atoms in NCO groups], such as 1,3- and 1,4-phenylenediisocyanates, 2,4- and 2,6-tolylenediiso-cyanates [TDI], diphenylmethane-2,4'-and 4,4'-diisocyanates [MDI], naphthalene-1, 5-diisocyanate, triphenylmethane-4,4',4'-triisocyanate, polymethylenepolyphenylenepolyisocyanates [PAPI] obtainable by phosgenation of aniline-formldehyde condensation products, and m- and p-isocyanatophenylsulfonylisocyanate; aliphatic polyisocyanates containing 2–18 carbon atoms, such as ethylenediisocyanate, tetramethylenediisocyanate, hexamethylenediisocyanate, dodecamethylenediisocyanate, 1,6,11-undecanediisocyanate, 2,2,4-trimethylhexanediisocyanate, lysine diisocyanate, 2,6-diisocyanatomethyl caproate, bis(2-isocyanatoethyl fumarate, bis(2-isocyanatoethyl) carbonate and 2-isocyanatoethyl-2,6-diisocyanato-hexanoate; alicyclic polyisocyanates containing 4–15 carbon atoms, such as isophorone diisocyanate, dicyclohexylmethane diisocyanates, cyclohexylene diisocyanates, methylcyclohexylene diisocyanates and bis(2-isocyanatoethyl) 4-cyclohexene-1,2-dicarboxylate; araliphatic polyisocyanates containing 8–15 carbon atoms, such as xylylene diisocyanates and diethylbenzene diisocyanates; and modified polyisocyanates of these polyisocyanates, containing urethane, carbodiimide, allophanate, urea, biuret, urethdione, urethimine, isocyanurate and/or oxazolidone groups, such as urethane-modified TDI, carbodiimide-modified MDI, urethane-modified MDI, and the like; as well as mixtures of two or more of them.

Among these polyisocyanates, preferred are aromatic diisocyanates, particularly TDI [including 2,4- and 2,6-isomers, mixtures of them and crude TDI] and MDI [including 4,4'- and 2,4'-isomers, mixtures of them and crude MDI], and modified polyisocyanates containing urethane, carbodiimide, allophanate, urea, biuret and/or isocyanurate groups, derived from TDI and/or MDI.

Suitable high molecular weight polyols (B2) employed for producing polyurethanes include, for example, polyether polyols, polyester polyols, polyolefin polyols, and mixtures of two or more of them.

Suitable polyether polyols include alkylene oxide (hereinafter referred to as AO) adducts of compounds containing at least two active hydrogen atoms, such as polyhydric alcohols, polyhydric phenols, amines, polycarboxylic acids, phosphrous acids and the like. Suitable examples of polyhydric alcohols include diols, such as ethylene glycol, propylene glycol, 1,3- and 1,4-butane diols, 1,6-hexane diol, neopentyl glycol, diethylene glycol, bis(hydroxymethyl)cyclohexane and bis(hydroxyethyl)benzene; and polyols having 3–8 or more hydroxyl groups, such as glycerol, trimethylol propane, trimethylol ethane, hexane triol, pentaerythritol, diglycerol, alpha-methylglucoside, sorbitol, xylitol, mannitol, glucose, fructose, sucrose, and the like. Exemplary of suitable polyhydric phenols are mono- and poly-nuclear phenols, such as hydroquinone, catechol, resorcin, pyrogallol, and bisphenols [bisphenol A, bisphenol F, bisphenol sulfon and the like], as well as phenol-formaldehyde condensation products. Suitable amines are inclusive of ammonia; alkanol amines, such as mono-, di- and triethanol amines, isopropanol amines and the like; aliphatic, aromatic, araliphatic and alicyclic monoamines, such as $C_1$–$C_{20}$ alkyl amines [methyl, ethyl, isopropyl, butyl, octyl and lauryl amines, and the like], aniline, toluidine, naphthyl amines, benzyl amine, cyclohexyl amine and the like; aliphatic, aromatic, araliphatic and alicyclic polyamines, such as $C_2$–$C_6$ alkylene diamines [ethylene diamine, tetramethylene diamine, hexamethylene diamine and the like], diethylene triamine, tolylene diamines, phenylene diamines, benzidine, methylenedianilines, diphenylether diamines, xylylene diamines, tetramethylxylylene diamines, isophorone diamine, 1,4-diaminocyclohexane and 4,4'-diaminodicyclohexylmethane; and heterocyclic polyamines, such as piperazine, N-aminoethylpiperazine, and other heterocyclic polyamines, written in JPN Patent Publication No.21044/1980. Suitable AO, employed for producing polyether polyols, include, for example, ethylene oxide (hereinafter referred to as EO), propylene oxide (herein-after referred to as PO), 1,2-, 2,3-, 1,3- and 1,4-butylene oxides, styrene oxide, epichlorohydrin and the like, as well as combinations of two or more of them. Among these, preferred are PO and combination of PO/EO [Weight ratio: usually 30/70–100/0, preferably 70/30–95/5]. Addition of AO to active hydrogen atom-containing compounds can be carried out in the usual way, with or without catalysts [such as alkaline catalysts, amine catalysts and acidic catalysts], under normal or elevated pressure, in a single step or multi-stages. Addition of different AO's [PO and EO] may be performed by random-addition, block-addition or combination of them [for instance, random-addition followed by block-addition]. Illustrative of such polyether polyols are polyethylene glycol, polypropylene glycol, polyethylene/propylene(block or random) glycol, polyethylene/tetramethylene(block or random) glycol, polytetramethylene-ether glycol and polyhexamethyleneether glycol.

Suitable polyester polyols are inclusive of condensation products of low molecular weight polyols [dihydric alcohols (such as ethylene glycol, propylene glycol, 1,3- and 1,4-butane diols, 1,6-hexane diol, 3-methyl-1,5-pentane diol, neopentyl glycol, 1,4-dihydroxymethylcyclohexane and diethylene glycol) and/or trihydric alcohols (such as glycerol and trimethylolpropane) and the like] and/or polyether polyols [such as those described above] with dicarboxylic acids [aliphatic dicarboxylic acids (such as succinic, adipic, sebacic, glutaric, azelaic, fumaric and maleic acids) and/or aromatic dicarboxylic acids (such as phthalic, iso-phthalic and terephthalic acids] or ester-forming derivatives thereof [anhydrides and lower alkyl esters, such as maleic and phthalic anhydrides, dimethyl terephtharate, and the like], for example, polyethylene adipate, polybutylene adipate, polyhexamethylene adipate, polyneopentyl adipate, polyethylene/butylene adipate, poly-3-methyl-1,5-pentane adipate and polybutylene iso-phthalate; ring-opening polymerization products of lactones [such as ε-caprolactone, 3-methyl-valerolactone], for instance, polycaprolactone diol and triol, and poly-3-methyl-valerolactone diol; and polycarbonate polyols, such as polyhexamethylene carbonate diol.

Illustrative of polyolefin polyols are polydiene polyols (such as polybutadiene glycol and polyisoprene glycol) and hydrogenated products of them.

Among these high molecular weight polyols, preferred are polyether polyols. Preferable polyether polyols are ones obtainable by PO/EO [Weight ratio: preferably 70/30–95/5], particularly polyethylene/propylene (random or block) glycol.

These high molecular weight polyols have usually 2–8 hydroxyl groups, preferably 2–4 hydroxyl groups, and have OH equivalent weight of usually 250–4,000, preferably 400–3,000.

Suitable chain extenders (B3) include low molecular weight compounds containing at least two [preferably 2–5] active hydrogen atom-containing groups (such as Hydroxyl group and/or amino groups) and having an equivalent weight [molecular weight per active hydrogen atom-containing group] of at least 30 and less than 250, for example, low molecular weight polyols, polyamines and amino alcohols. Illustrative of suitable low molecular weight polyols are dihydric and trihydric alcohols as mentioned above as raw materials for polyether polyols (such as ethylene glycol, diethylene glycol, propylene glycols, 1,3- and 1,4-butane diols, 1,6-hexane diol, glycerol, trimethylolpropane and the like), and low mole AO adducts of these polyols and/or amines, as well as mixtures two or more of them. Examples of suitable polyamines include aliphatic, aromatic, araliphatic and alicyclic polyamines as mentioned above as raw materials for polyether polyols (such as ethylene diamine, tetramethylene diamine, hexamethylene diamine, diethylene triamine, tolylene diamines, phenylene diamines, benzidine, methylene dianilines, xylylene diamines, tetramethylxylylene diamines, isophorone diamine, 1,4-diaminocyclohexane and 4,4'-diaminodicyclohexylmethane), as well as mixtures two or more of them. Amino alcohols, include, for instance, alkanol amines as mentioned above (such as ethanol amine), and low mole AO adducts of the above-mentioned diamines (such as N-hydroxyethylethylene diamine). Among these chain extenders (B3), preferred are low molecular weight polyols, particularly diols.

In the present invention, polyisocyanate (B1), high molecular weight polyol (B2) and chain extender (B3) are reacted in such a ratio to give said polyurethane resin (B) having a content of nitrogen atoms (contained in the urethane groups) of at least 3%, preferably at least 5%, more preferably 6–10% by weight. Use of polyurethane resin having a nitrogen atom content of less than 3% results in poor vibration-damping properties.

In producing said polyurethane resin (B), the amount of chain extender (B3) is generally not more than 60%, preferably 4–50%, based on the total weight of high molecular weight polyol (B2) and chain extender (B3). The average molecular weight of high molecular weight polyol (B2) and chain extender (B3) is usually not more than 600, preferably not more than 500 and at least 100.

In general, polyisocyanate (B1) is used in such an amount providing NCO-index of 80–120, preferably 90–110.

Polyurethane resins can be produced in known manners, including one-shot process, semi-prepolymer process and prepolymer process.

It is essential that said polyurethane resin (B) has a solubility parameter (hereinafter referred to as SP) which is higher by at least 2.5 than that of said thermoplastic resin (A). The difference between the SP of polyurethane resins (B) and the SP of resin (A) is usually 2.5–5.0, preferably 3.0–4.5. SP of thermoplastic resin (A) are usually 7.0–9.0% preferably 7.5–8.5. In the above, SP can be determined according to Robert F. Fadors, Polymer Engineering & Science, Vol. 14, p. 151, and is represented by a squre root of quotient of cohesive energy density divided by molecular volume: $SP=\sqrt{\Delta E/V}$ wherein $\Delta E$ is cohesive energy density and V is molecular volume.

(C) Compatiblilizer or Dispersant

In producing said polyurethane resin (B) by reacting a polyisocyanate (B1) with a high molecular weight polyol (B2) and a chain extender (B3) insitu in a melted thermoplastic resin (A), the reaction may be carried out in the presence of a compatiblilizer or dispersant (C). Suitable compatiblilizers or dispersants (C) include, for example, those disclosed in GB Patent Application No. 9115301.5. Such dispersants include (I) those having both (i) a moiety having substantially the same SP as said thermoplastic resin (A) or said polyurethane resins (B) and (ii) at least one reactive group (such as carboxylic, carboxylic anhydride, amino, hydroxyl, isocyanate and epoxy groups), and (II) those having both (i) a moiety having substantially the same SP as said thermoplastic resin (A) and (ii) a moiety having substantially the same SP as said polyurethane resins (B). In the above, substantially same SP means that the difference in SP between the moiety and the resin is not more than 0.5. Illustrative of (C) are maleic (anhydride)-modified polypropylene, maleic (anhydride)-modified polyethylene, amino-modified low molecular weight polypropylene, amino-modified low molecular weight polyethylene, hydroxyl-terminated hydrogenated maleic-modified polypropylene, hydroxyl-terminated hydrogenated maleic-modified polyethylene, and mixtures of 2 or more of them. Among these, preferred are maleic (anhydride)-modified polypropylene and maleic (anhydride)-modified polyethylene. These compatiblilizers or dispersants (C) have a number-average molecular weight of usually about 800—about 3,000,000, preferably about 1,000—about 1,000,000

Composite

In the elastomeric composite of the present invention, the content of thermoplastic resin (A) is usually 10–60%, preferably 20–40%, the content of polyurethane resin (B) is 90-40%, preferably 80-60%, and the content of compatiblilizer or dispersants (C) is generally 0–20%, preferably 2–10%. In the above and hereinafter, % represents % by weight.

The elastomeric composite of this invention may be produced by reacting a polyisocyanate (B1) with a high molecular weight polyol (B2) and a chain extender (B3) insitu in a melted thermoplastic resin (A), optionally in the presense of a compatiblilizer or dispersant (C), within any known mixing machine. Suitable mixing machines include, for example, extruders (such as twin-screw extruder), kneaders, Banbury mixers and planetary mixers. The reaction can be carried out at a temperature of generally 10°–350° C., preferably 100°–300° C., under a normal pressure or under pressure of upto 20 atm., preferably upto 10 atm. It is preferred for inhibitiong thermal degradation to carry out the reaction within a period of time as short as possible, for instance, 0.8–60 minutes, preferably 1–30 minutes.

In producing composites according to this invention, there may be used, if necessary, any known materials, such as catalysts [for example, organo-matal compounds (particularly organo-tin compounds, such as dibutyltin dilaurate, dioctyltin dilaurate and stannous octoate) and/or amine compounds (such as triethyl amine, triethylene diamine and diazabicycloundecene); mold-release agents (such as hydrocarbon waxes and silicone compounds), lubricants, plasticizers, colorants (pigments and dyes), blowing agents [halogenated hydrocarbons (such as methylene chloride, chloroform, ethylidene dichloride, vinylidene chloride, trichlorofluoromethane, dichlorofluoromethane) and/or water], stabilizers (weathering stabilizers and thermal stabilizers, such as age antioxidants and resistors), flame-retardants (such as phosphorus compounds, halogen compounds and $Sb_2O_3$), surfactants (such as silicone surfactants), coupling agents, germicides, fillers (such as carbon black, titanium dioxide, diatomaceus earth, glass fiber, shattered glass fiber, talc, mica, silica, sand, aluminum powder, graphite and asbestos) and other auxiliaries, usually employed in producing polyurethanes.

Composites of the invention may be molded according to any known method, for example, by injection molding, extrusion molding and compression molding. Injection molding is preferred in view of workability and productivity.

Composites according to the present invention show high vibration-damping properties (such as Tan δ of 0.1 or more) over a wide temperature range (such as −20° C. to 60° C.). Besides, these composites have, over such a wide temperature range, high resin strengths, such as modulus of $10^7$–$10^9$ dyne/cm$^2$ and Shore A hardness of at least 20.

Accordingly, composites of this invention are useful as vibration dampers or vibration insulators in various applications, for example, as vibration-deadened components or members, in transports, including vehicles, such as automobiles and railway rolling stocks, aircrafts and water craft; members, requiring damping properties, in various industrial machines, various electrical, electronical or other apparatuses or appliances (such as computers, printers, air-conditioners, washing machines, cleaners, acoustic or audio systems, pianos, organs and so on; noize-reducing members in various noise sources in factories and residences; inner-soles for sports shoes and the like.

Having generally described the invention, a more complete understanding can be obtained by reference to certain specific examples, which are included for purposes of illustration only and are not intended to be limiting unless otherwise specified.

In the following examples, parts represents parts by weight, and raw materials and measuring methods used therein are as follows:

(1) Raw materials

Each composite was injection molded under conditions of cylinder temperature 170° C. and mold temperature of 160° C. into a bar of 50 mm×5 mm×2 mm, followed by measuring Tan δ (20° C.), modulus ($10^7$ dyne/cm$^2$) and hardness of it. The results were as shown in Table 1.

For comparison, the results of each bar of 50 mm×5 mm×2 mm of vibration-dampers on the market are also shown in Table 1.

TABLE 1

| Example No. | Example | | | | | Comparative Example | | |
|---|---|---|---|---|---|---|---|---|
|  | 1 | 2 | 3 | 4 | 5 | 1 | 2 | 3 |
| IIR, parts | 35 | 35 | — | 20 | 35 | Vibration-dampers on the market | | |
| EPR, parts | — | — | 30 | — | — | | | |
| PEPG, parts | 40 | 10 | 26 | — | 24 | IIR, | SBR, | PU**, |
| PEA, parts | — | — | — | 17 | — | pres- | pres- | pres- |
| EG, parts | 3 | — | 4 | — | 7 | sure | sure | sure |
| BG, parts | — | 9 | 3 | 16 | — | molded | molded | molded |
| MDI, parts | 22 | 41 | 32 | 47 | 34 | at | at | at |
| PP-MA, parts | — | 5 | 5 | — | — | 160° C. | 200° C. | 180° C. |
| NCO % of (B) | 3.8 | 7.7 | 5.5 | 6.6 | 5.9 | | | |
| Tan δ | 1.2 | 1.0 | 1.0 | 1.1 | 1.1 | 0.3 | 0.1 | 0.6 |
| Modulus | 3.0 | 4.2 | 6.5 | 7.6 | 7.2 | 0.5 | 9.6 | 0.1 |
| Hardness | 42 | 26 | 76 | 85 | 82 | 24 | 78 | 12 |
| Injection moldability* | ◯ | ◯ | ◯ | ◯ | ◯ | Δ | X | X |

(Note)
*◯: good;
Δ: poor;
X: bad.
**polyether polyol-based polyurethane resin.

IIR: isobutylene-isoprene rubber (JSR Butyl 065, produced by Japan Synthetic Rubber K.K.).

EPR: ethylene-propylene rubber (propylene content:30%, number-average molecular weight:70,000).

PEPG: EO adduct of polypropylene glycol (MW:900, EO content:10%).

EG: ethylene glycol.

BG: 1,4-butane diol.

MDI: 4,4'-diphenylmethane diisocyamate

PP-MA: maleic anhydride-modified polypropylene (combined maleic anhydride:10%, number-average molecular weight 5,000: U-Mex 1010, produced by Sanyo Chemical Industries, Ltd.).

PEA: polyethylene adipate diol (number-average molecular weight: 2,000).

(2) Tan δ and modulus: measured with use of Vibron produced by Orienteck Co., at frequency of 100 Hz and rate of temperature increase of 2° C./minute.

(3) Hardness: Shore A in accordance with JIS K6301.

Example 1

Into a twin-screw improver (2D25-S, produced by Toyoseikiseisakusho, 20 mmφ, L/D=25), 35 parts of IIR, 40 parts of PEPG, 3 parts of EG, parts of and 22 parts of MDI were kneaded under melt at a cylinder temperature of 160° C. for 10 minutes to obtain a composite [1].

Examples 2, 3, 4 and 5

Example 1 was repeated in accordance with the formulations written in Table 1 to obtain composites [2], [3], [4] and [5].
Evaluation

What is claimed as new and desired to be secured by Letters Patent is:

1. A vibration-absorbing elastomeric composite, which comprises
   (A) 10–60% by weight of at least one thermoplastic resin selected from the group consisting of olefinic polymers, ethylene-unsaturated ester copolymers and natural rubber, and
   (B) 90–40% by weight of a polyurethane resin, prepared by reacting a polyisocyanate with a polyol insitu in melted thermoplastic resin (A):
   wherein said polyurethane (B) has a nitrogen atom content of at least 3% by weight and has a solubility parameter which is higher by at least 2.5 than that of said thermoplastic resin and wherein said composite has a Tan δ of at least 1.0 at 20° C.

2. The composite of claim 1, wherein said olefinic polymer is a homopolymer or copolymer of a monoethylenically unsaturated hydrocarbon and/or a diene.

3. The composite of claim 1, wherein said olefinic polymer is selected from the group consisting of ethylene-α-olefin copolymers, polyisobutylene, polyisoprene, polybutadiene, styrene-diene copolymers and isobutylenediene copolymers.

4. The composite of claim 1, wherein said olefinic polymer is ethylene-propylene copolymer or isobutyleneisoprene copolymer.

5. The composite of claim 1, wherein said ethylene-unsaturated ester copolymer is selected from the group consisting of ethylene-vinyl acetate copolymers, ethylene-acrylate copolymers and ethylene-methacrylate copolymers.

6. The composite of claim 1, wherein said polyurethane resin has a nitrogen atom content of at least 5% by weight.

7. The composite of claim 1, wherein said polyurethane resin is prepared by reacting a polyisocyanate with a polyol having a number-average molecular weight of 500 or less.

8. The composite of claim 7, wherein said polyol is a polyalkylene ether polyol.

9. The composite of claim 8, wherein the polyalkylene ether polyol is poly(ethylene and/or propylene) glycol.

10. The composite of claim 1, which further comprises a compatibilizer.

11. The composite of claim 10, wherein said polyurethane resin is prepared by reacting a polyisocyanate with a polyol insitu in a melted said thermoplastic resin in the presence of the compatibilizer.

12. The composite of claim 10, wherein the compatibilizer is maleic-grafted polyethylene or maleic-grafted polypropylene.

13. The composite of claim 10, wherein the compatibilizer is used in an amount of at most 10% by weight.

14. The composite of claim 10, wherein said compatibilizer is present in an amount of up to 20% by weight.

15. The composite of claim 1, which has a modulus of $10^7$–$10^9$ dyne/cm$^2$ at 20° C.

16. The composite of claim 1, which has a Shore A hardness of at least 20° at 20° C.

17. The composite of claim 1, which comprises 20–40% by weight of said thermoplastic resin (A) and 80-60% by weight of said polyurethane resin (B).

18. The composite of claim 1, wherein said polyurethane resin has a nitrogen atom content of from 6–10% by weight and wherein the molecular weight of said polyol is not more than 500 and at least 100.

19. The composite of claim 1, wherein said thermoplastic resin is selected from the group consisting of olefinic polymers and ethylene-unsaturated ester copolymers.

20. The composite of claim 1, consisting essentially of components (A), (B), and, optionally, up to 20% by weight of a compatibilizer.

21. The composite of claim 20, wherein the isocyanate index of the polyurethane resin is from 80 to 120.

22. The composite of claim 1, wherein the isocyanate index of the polyurethane resin is from 80 to 120.

23. The composite of claim 1, wherein said thermoplastic resin has a weight average molecular weight of from 10,000 to 3,000,000 and wherein said polyol comprises a polyol having an OH equivalent weight of from 250 to 4,000.

24. The composite of claim 23, wherein the isocyanate index of the polyurethane resin is from 80 to 120.

25. The composite as claimed in claim 23, consisting essentially of components (A), (B), and, optionally, up to 20% by weight of a compatibilizer.

26. The composite of claim 25, wherein the isocyanate index of the polyurethane resin is from 80 to 120.

27. The composite as claimed in claim 1, wherein said composite has a Tan δ of from 1.0–1.2 at a temperature of 20° C.

28. A vibration damper or vibration insulator, which comprises the composite of claim 1.

29. A vibration-deadened component or member, which comprises the composite of claim 1.

30. A transport selected from the group consisting of vehicles, aircrafts and watercrafts comprising a component or member as claimed in claim 29.

31. A process for producing the composite of claim 1, which comprises reacting a polyisocyanate with a polyol insitu in a melted thermoplastic resin (A), in the presence or absence of a compatibilizer.

32. The process of claim 31, wherein said compatibilizer is present in an amount up to 20% by weight.

\* \* \* \* \*